United States Patent [19]
Frederick

[11] Patent Number: 5,581,013
[45] Date of Patent: Dec. 3, 1996

[54] METHOD AND SYSTEM FOR OBTAINING USEFUL FOUNDATION INFORMATION

[75] Inventor: Leonard L. Frederick, Whippany, N.J.

[73] Assignee: Frederick Engineering Company, Whippany, N.J.

[21] Appl. No.: 389,422

[22] Filed: Feb. 14, 1995

Related U.S. Application Data

[63] Continuation of Ser. No. 77,150, Jun. 16, 1993, abandoned.

[51] Int. Cl.$^6$ ........................................... G01L 5/00
[52] U.S. Cl. ............................... 73/11.03; 73/84
[58] Field of Search ................ 73/11.01, 11.02, 73/11.03, 12.13, 84

[56] References Cited

U.S. PATENT DOCUMENTS

| | | | |
|---|---|---|---|
| 3,498,388 | 3/1970 | Jovis | 73/84 |
| 3,535,919 | 10/1970 | Budlong et al. | 73/84 |
| 3,931,729 | 1/1976 | Frederick | 73/11.03 |
| 3,960,008 | 6/1976 | Goble et al. | 73/84 |
| 4,052,884 | 10/1977 | Miltberger et al. | 73/11.03 |
| 4,174,625 | 11/1979 | Miltberger et al. | 73/11.03 |
| 4,359,890 | 11/1982 | Coelus | 73/84 |
| 4,400,970 | 8/1983 | Ali | 73/84 |
| 4,554,819 | 11/1985 | Ali | 73/84 |
| 4,586,366 | 5/1986 | Miltberger | 73/11.03 |
| 5,099,702 | 3/1992 | French | 73/862.68 |

Primary Examiner—Richard Chilcot
Assistant Examiner—Ronald Biegel
Attorney, Agent, or Firm—Edwin E. Greigg; Ronald E. Greigg

[57] ABSTRACT

A pile bearing capacity determination system which allows the pile driver operator to determine the bearing capacity of a pile while it is being driven without interrupting the driving operation to perform a dead load test. Force sensors are cast in the pile at the head, toe and mid-portion and also an acceleration sensor is cast in the head of the pile. An ultra-fast sensor produces a detailed profile of the force exerted by each hammer blow on the pile. The hammer force at which the pile breaks loose from surrounding soil and begins to move during a hammer blow correlates quite well with bearing capacity of the pile determined by dead load tests. Points on the acceleration curve help verify transition points on the force profile. The force and acceleration curves are indicated simultaneously on an oscilloscope and plotter.

18 Claims, 7 Drawing Sheets

METHOD AND SYSTEM FOR OBTAINING USEFUL FOUNDATION INFORMATION

This is a continuation of application Ser. No. 08/077,150 filed on Jun. 16, 1993 now abandoned.

BACKGROUND OF THE INVENTION

Pile foundations have been used for major structures for a very long time. It has also been very difficult to determine when the bearing capacity of the driven pile is sufficient to support the intended load. Ever since pile foundations were introduced, engineers have calculated the bearing capacity by empirical formulas and have used the costly dead load test to verify the results. In a dead load test a test pile is loaded incrementally over a period of time to twice its intended load and then the load is gradually removed. About thirty empirical formulas have been devised, all equating the bearing capacity to the hammer energy, divided by the set, plus a coefficient for the compression of the pile, drive cap and soil. The set is the net movement of a pile after it is struck with a hammer. Some formulas include other arbitrary factors such as: the coefficient of restitution; the weight of the pile divided by the ram weight; and the soil type. In 1957, Mr. E. A. Smith applied Timoshenko's elastic wave equations for rod-like objects to a pile without skin friction. He proved that the two most popular bearing formulas, The Engineer News and The Hiley, were flawed in many respects. In the early sixties, Michigan State University performed extensive tests using various hammers and piles. All of the proposed formulas yielded various results, but none matched or correlated acceptably with the dead load test. Neither Smith or Michigan suggested a revised formula nor developed a new one. Nevertheless, in the seventies, the elastic wave equation formulas were put to commercial use and were recommended by many foundation authorities as the best possible solution to this very difficult problem. They too have found the results at variance with the dead load test and have had to add reconciliation factors to make them agree. I have made a number of attempts to instrument a pile so that the bearing capacity of the pile can be determined while it is being driven. U.S. Pat. Nos. 3,817,091; 3,897,835 and 3,931,729 document these efforts; testing indicated the need for faster more sophisticated recording instruments.

In practice, engineers responsible for providing a sound foundation continue to doubt the reliability and accuracy of these arbitrary factors and adjustments. In the absence of a viable alternative, the costly dead load test is generally performed anyway.

SUMMARY OF THE INVENTION

The present invention allows a pile driver operator to repeatedly determine the bearing capacity of a pile while it is being driven without interrupting the driving operation to perform a dead load test. This is made possible by determining the profile of the force curve for the force exerted by the hammer on the pile and identifying the three distinct portions of that force profile. Those three portions are: 1) a first static portion during which the pile is not actually moving in relation to the soil surrounding it because the pile has not yet broken loose from the soil, 2) a dynamic portion during which the pile has broken loose from the surrounding soil and is moving with respect to it, and 3) a final static portion during which the surrounding soil has again seized the pile and the pile is not moving relative to the soil. From the profile of the force curve, the force required to break the pile loose from the surrounding soil can be determined and it has been found that this force is within a range of 5 to 10 percent of the bearing capacity of the pile which could be measured if pile driving were stopped and a dead load test carried out.

The profile of the force curve can be displayed on an oscilloscope and plotted on a plotter during each hammer blow. From this profile, the pile driver operator can determine the force required to break the pile loose from surrounding soil. The force determined in this manner correlates quite acceptably with the bearing capacity determined by a dead load test. In order to verify or check the transition points between the static, dynamic and static portions of the force profile, the acceleration of the pile can also be simultaneously measured, displayed and plotted during the hammer blow. The nodes and anti-nodes on the acceleration curve occur at the same times as the transition points on the force profile. In this way the operator can verify the time locations on the force profile where the force readings are to be made. The rapid deceleration of the hammer ram when it strikes a pile causes tremendous force and a rapid expenditure of two classifications of energy. Energy associated with force that does not cause movement of the pile relative to the surrounding soil is called an impulse force or thrust; it is measured in terms of pound-seconds. It is expended mostly in the form of heat, deformation of the soil and the pile, vibration and noise. The combination of dynamic force and energy that causes movement of the pile relative to the surrounding soil is measured in terms of foot-pounds. Driving a pile employs both forms of forces and energies. The separation, classification and measurement of the two forms of forces and energies is the difficult part. The following system provides this analysis to help the foundation engineer.

The axiom to follow is: "A superior force breaks a static pile loose, while energy moves it to a new point of resistance."

DEFINITIONS

The following definitions are to be considered in the description of the invention.

(1) PILE BEARING, ULTIMATE BEARING CAPACITY, TRUE BEARING CAPACITY: The ability of a pile to withstand a load for an extended period of time.

(2) DEAD LOAD TEST: The incremental loading of a test pile over a period of time (24 or 48 hours) normally to twice its design load and then the load is gradually removed. If the pile fails to return to within ¼' of its original elevation, it is considered a failure. This is established by ASTM designation D1143-69 entitled "SETTLEMENT RELATIONSHIP FOR INDIVIDUAL VERTICAL PILES UNDER STATIC LOAD."

(3) SET: The net movement of a pile after it is struck with a hammer.

(4) $F_{sd}$, MOMENT OF MOVEMENT: The transition point from a static state to a dynamic one when friction is involved such as in pile driving.

(5) $F_p$: Maximum force on pile head (6) $F_t$: Resisting force at the toe of the pile offered by the soil.

(7) $F_{sf}$: Skin friction resistance along the sides of the pile.

(8) $F_n$: Force in tension at midpoint of the pile.

(9) $F_{ds}$, MOMENT OF SEIZURE: The transition point from a dynamic state to a static one when static friction overcomes movement.

(10) IMPULSE FORCE or THRUST: Product of force and time (11) DYNAMIC ENERGY or KINETIC ENERGY: Product of force and distance

DESCRIPTION OF THE THEORY UNDERLYING THE INVENTION

Figure 1:
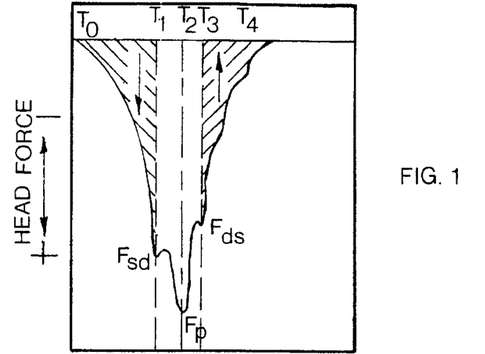
FIG. 1 is a typical graph of the output of the pile head sensor; impulse force versus time, for the duration of the hammer blow.
Figure 6:
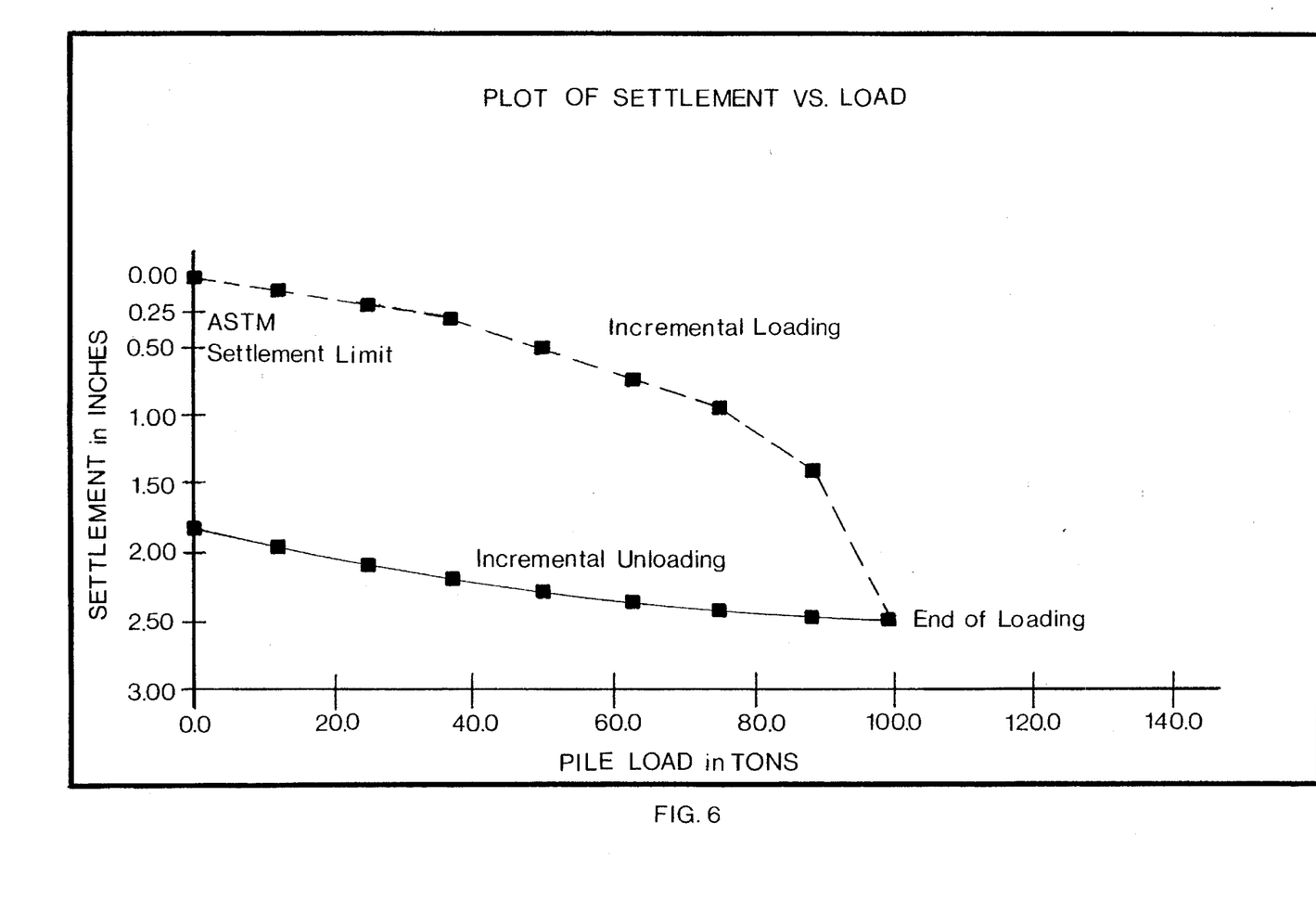
FIG. 6 is a typical graph of a dead load test conducted on a driven pile.

By using ultrafast sensor and recording equipment, I have discovered the following useful information on the profile of the impulse curve caused by the impact of a pile hammer on the head of a pile:

The bearing capacity of a pile while it is being driven is of prime importance. A typical force curve is shown in FIG. 1, and the important events are designated on its profile. The impulse force from the hammer starts at $T_0$ and intensifies to $F_{sd}$ at which time the static resistance of the pile is overcome and the pile starts to move or penetrate the soil further. This moment of movement is marked by an offset to the right on the curve due to a change in the resistance from static to dynamic. The force on the pile head at this moment of movement is indicated as $F_{sd}$ in FIG. 1. It has been determined that the force $F_{sd}$ exerted at this moment correlates acceptably, within a range of 5% to 10% to the last increment of force which could be applied on a driven pile during a dead weight test at or near failure. That is, force $F_{sd}$ correlates acceptably with the bearing capacity of the pile. This correlation is attributable to the cohesion of soil on the side of the pile, resulting in its increased static resistance. Such soil cohesion also occurs during the time span of a typical set-up and execution of a dead load test. FIG. 6 shows a typical dead load test curve. Therefore, the ultimate bearing capacity of a pile will generally be slightly greater than the hammer impulse force, $F_{sd}$. In order to check this correlation, following a dead load test, simply reconnect the umbilical cable to the connector and re-strike the pile with the hammer. Then compare the readings from the first and second blows to those taken previously during the dead load test.

The maximum force on the pile head is the peak force recorded on the impulse curve, FIG. 1, which is $F_p$. However, in certain soft strata the sum of the toe resistance force, $F_t$, plus the dynamic skin friction resistance, $F_{sf}$, will not exceed the force at the moment of movement, $F_{sd}$, and therefore, when this event occurs, $F_{sd}$ will be the maximum force on the pile head.

Figure 2:
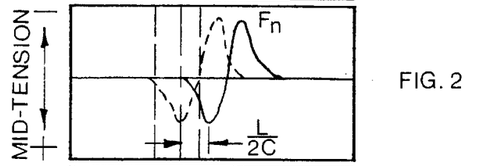
FIG. 2 is typical graph of the output of the midpile tension sensor; impulse force versus time, for the duration of the hammer blow.

The maximum force at the midpoint of the pile is recorded on the tension force curve, FIG. 2, as $F_n$. this force is especially important when driving concrete piles; should the tensile strength of the reinforced concrete piles be exceeded, failure will develop.

Figure 3:
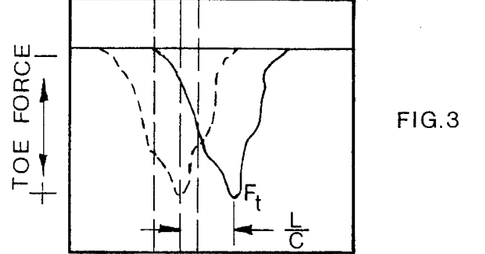
FIG. 3 is a typical graph of the output of the pile toe compression sensor; impulse force versus time for the duration of the hammer blow.

The resisting force exerted by the soil on the pile toe is recorded on FIG. 3 as $F_t$. This force ranges from practically nothing to the full bearing capacity of the pile, depending on the resistance encountered. A substantial pile toe resistance is considered important for high bearing piles and for piles that support structures subject to impact loading, such as bridges.

Early detection of pile damage while driving can be viewed on an oscilloscope screen while the driving is taking place. When the repetitive force curves (FIG. 1) change abruptly and the repetitive toe curves diminish, then it is evident that the pile has either broken, if it is a concrete pile, or buckled, in the case of a steel pile.

METHOD OF ANALYSIS

Figure 4:
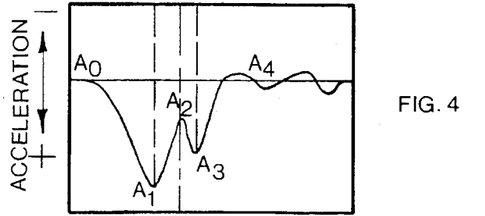
FIG. 4 is a typical graph of the output of the acceleration sensor; acceleration versus time for the duration of the hammer blow.

The information above can be checked by the following method: the acceleration curve (FIG. 4) is used to check the location of the moment of movement, $F_{sd}$, the moment of seizure, $F_{ds}$, and the extent of the dynamic compression force, $F_p$. At point $A_1$ the pile starts to move, and it coincides with $F_{sd}$ (FIG. 1) when projected and at point $A_3$ the pile stops moving, and it coincides with $F_{ds}$ (FIG. 1). At point $A_2$ the hammer energy is fully expended on the pile and the peak force, $F_p$, occurs.

The composition of the impulse curve (FIG. 1) as to the classification of forces and energies involved can be determined. Separation of impulse forces and energies from dynamic forces and energies can be performed by simply projecting lines from $F_{sd}$ and $F_{ds}$ to $T_1$ and $T_3$ respectively. Then by integrating the newly formed areas the following information can be obtained:

The percentage of effective hammer impulse imposed on the pile is derived by the ratio of the impulse divided by the momentum times 100. The impulse force on the pile, which is a product of force and time, can be determined by finding the area $T_0$, $F_p$, $T_4$, in terms of pound-seconds. The momentum of the hammer that produced the impulse is a product of the ram mass and its velocity at impact, and is likewise measured in pound-seconds.

The percentage of hammer output that is effective in driving the pile is derived by the ratio of the dynamic energy absorbed by the pile minus the energy absorbed by its inertia divided by the output of the hammer, multiplied by 100. The component of dynamic energy within the impulse curve that causes pile movement can be found by substituting the pile set in feet in place of the elapsed time $T_1$, to $T_3$ (FIG. 1). By determining the area $T_1$, $F_p$, $T_3$, the amount of work in terms of foot-pounds can be measured. The output of the hammer is the product of the ram weight and the fall height in feet. As the pile nears refusal, this ratio diminished to almost zero— leaving only the compressing and decompressing cycle of the pile.

The impulse energy absorbed by the soil prior to pile movement is simply found by determining the area under the curve between $T_0$ and $T_1$ on the head force curve (FIG. 1). This energy is not expended in the driving of the pile.

The energy absorbed by the soil from the rebounding pile is found by integrating the area under the curve between $T_3$ and $T_4$ on the head force curve FIG. 1. This energy does not drive the pile.

The amount of energy absorbed by the inertia of the pile during a blow of the hammer is found to be equal to the mass of the pile multiplied by its average acceleration, from $A_0$ to $A_1$ (FIG. 4), and the set of the pile.

The rate of force intensity is the slope of the compression side of the head force curve up to $F_{sd}$ (FIG. 1).

The rate of force decay is the slope of the decompression side of the head force curve from $F_{ds}$ to $T_4$ (FIG. 1).

The skin friction resistance of the soil on the pile, $F_{sf}$, can be found by subtracting the pile toe force $F_t$, from the pile head force, $F_p$.

The graphs FIGS. 1, 2, 3 and 4 have all been inverted to read positive (+) downward so they will read in the same direction and can be compared more easily. Further, the time axis for the mid-pile tension curve, FIG. 2 and the toe force curve, FIG. 3, have been shifted to the left by an amount of $$\frac{L}{2C}$$

and $$\frac{L}{C}$$

respectively. Their original positions are shown in phantom.

L=the length of the pile

Figure 5:
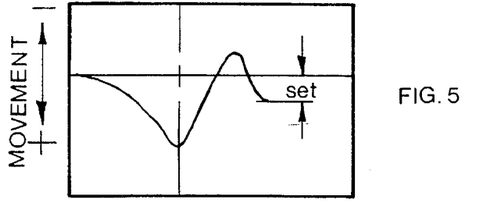
FIG. 5 is a typical graph of the pile movement relative to the earth versus time for the duration of a hammer blow.

C=the velocity of the shock wave in the pile material. The pile movement, FIG. 5 is generally taken manually. The net set is the pile movement for one blow of the hammer.

Figure 7:
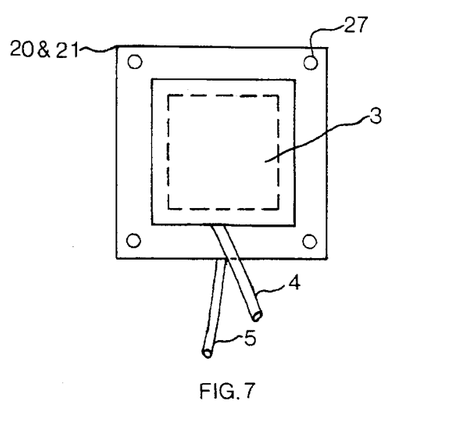
FIG. 7 is a plan view of a compression force sensor.
Figure 8:
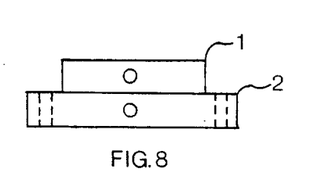
FIG. 8 is an elevation view of a compression force sensor.

Turning now to FIGS. 7 and 8 a top view and an elevational view of the compression force sensors 20 and 21 is shown. The top plate 1 and the bottom plate 2 hold the piezo film 3, which is shown in FIG. 7, in place. Also shown in FIG. 7 are the lead wires 4 and 5 which make contact with the film 3 and extend from the top plate 1 and the bottom plate 2. The holes 27 are for mounting the sensor in the casting forms. Piezo film will be discussed in the INSTRUMENTATION section below.

Figure 9:
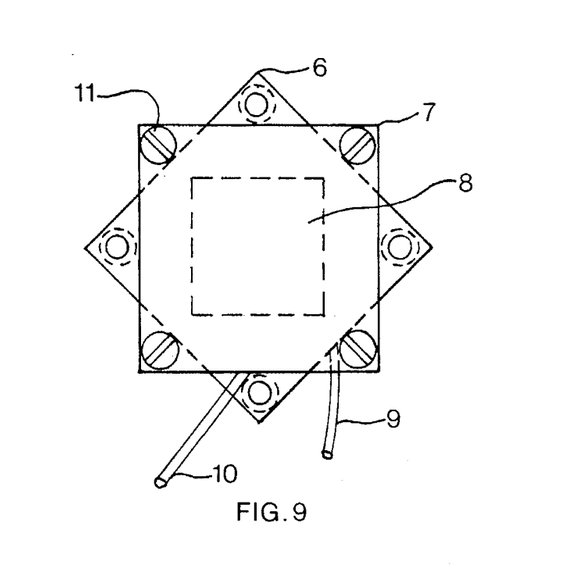
FIG. 9 is a plan view of a tension sensor.

Referring to FIG. 9, a top plan view of the tension sensor 22 is shown. The plates 6 and 7, which hold the piezo film 8 in place are offset to create a clearance for the tension bolts 11. The tension bolts 11 are more clearly shown in FIG. 10. The lead wires 9 and 10, that make contact with the filament 8, extend from plates 6 and 7.

Figure 11:
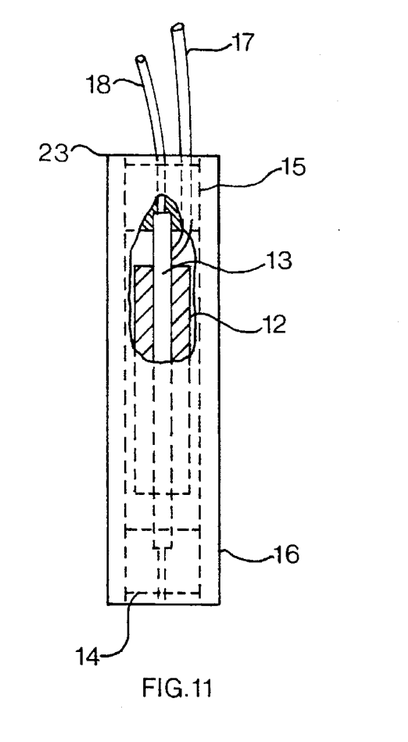
FIG. 11 is an elevation view of an acceleration sensor.
Figure 12:
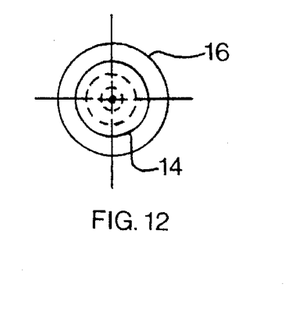
FIG. 12 is an end view of an acceleration sensor.

In FIG. 11, an acceleration sensor 23 is shown with a partially sectioned elevational view of the acceleration sensor 23 shown. The acceleration sensor 23 consists of a mass 12 which surrounds an piezo cable 15 that is suspended by two end plugs 14. The end plugs 14 are supported by a cylindrical enclosure 16 that is also shown in FIG. 12 which is an end view of the acceleration sensor 23. The lead wires 17 and 18 are connected to the piezo cable 15 and extend from an end plug.

The force and acceleration sensors are mounted in the piles using tie wire 25 (FIG. 14) in a spider web fashion. The wire is attached to the sensors and then it is wrapped around the tension cables 26 in the pile. The wires are tightened so that the sensors will remain in place when the concrete is poured. The multi-circuit cable 27 is attached to one of the tension cables in order to keep it protected during the pouring of the concrete. The multi-circuit cable is protected with a heavy plastic tubing where it extends out of the pile, so that the cable cannot be pinched when it is transported or driven.

The compression force sensor in FIGS. 7 and 8 has two insulated plates which form the body of the sensor. The plates have a higher modulus than concrete. The lead wires are cast into the contacts which are cast into the plates. These contacts allow the electrons to flow from the film that is set between the two plates to the recording instruments. The piezo film has an ultra-fast response time and is sensitive to full impulse force loads. The sensors are waterproof and compatible to concrete casting techniques.

The acceleration sensor in FIGS. 11 and 12 has an ultra-fast response time and a high acceleration. The sensor has a tensioned piezo cable 15 that has a weight 12 attached to it. The piezo cable is suspended in an insulated tube with two end plugs 14. The positive and negative leads are attached to the piezo cable in one of the plugs. The leads allow the electrons to flow to the reading instruments. The unit is waterproof and compatible with standard concrete casting methods.

Figure 10:
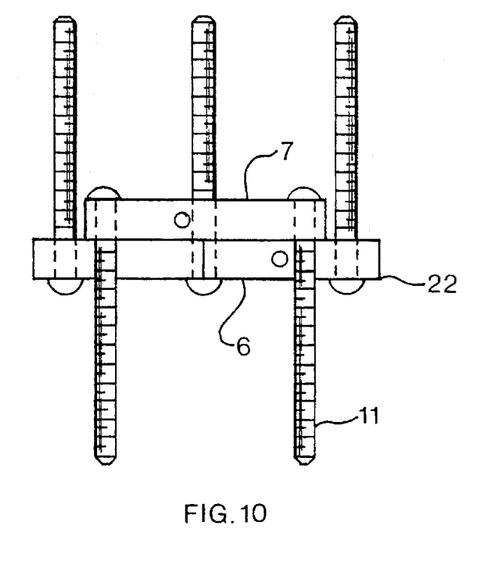
FIG. 10 is an elevation view of a tension sensor.

The tension force sensor in FIGS. 9 and 10 has two offset insulated plates that form the body of the sensor. The plates have a higher modulus than concrete. The leads are cast into contacts which are cast into the plates. The tension bolts are attached in such a fashion that when the pile is in tension the sensor is in compression. The film is set between the two plates, and the contacts allow the electrons to flow to the recording instruments. The sensor has an ultra-fast response time and is sensitive to full impulse force loads. The sensor is waterproof and compatible to standard concrete casting techniques.

Complete pile bearing information can be obtained from steel pipe piles and steel H-beam piles through the use of head and toe adaptors, as described in the following paragraphs.

Limited useful pile bearing information can be obtained by re-striking a previously driven pile by using only head adaptors for steel pipe piles, steel H-beam piles, and concrete piles; head adaptors are described in the following paragraphs.

The pipe pile head compression force adaptor consists of a short section of pipe pile with a steel plate creating a cavity that is filled with concrete. The compression sensor is cast into the concrete and a manifold cable extends out of the adaptor to an electrical connector. The top of the adaptor has a seat for a pile cushion to sit into. The cushion protects the cast concrete and the pipe pile. The adaptor is then connected to the pipe pile with a loose fitting connector ring. The pipe pile head compression force adaptor can also include an acceleration sensor cast into the concrete.

The pipe pile toe compression force adaptor consists of a short section of pipe pile that has s steel plate creating a cavity that is filled with concrete. A compression sensor is cast into the concrete. The concrete is faced down and the adaptor is attached to the pipe pile with a standard connector. A shielded manifold cable extends out of the adaptor and along the pile to an electrical connector.

The H-beam head compression force adaptor is made by boxing a short section of H-beam and casting a compression sensor into the boxed section with concrete. A pile cushion sits in a cavity and protects the concrete and the pile. The adaptor connects to the pile using a loose fit H-beam adaptor. A manifold cable extends out of the adaptor to one side of an electrical connector. The H-beam head compression adaptor can also include an acceleration sensor cast into it.

The H-beam toe compression adaptor is made from a short section of H-beam. The section is partially boxed and the compression sensor is cast in with concrete. The adaptor is attached using a standard H-beam adaptor. A shielded manifold cable extends out of the adaptor and along the pile to one side of an electrical connector.

The head compression force adaptor for concrete piles is made from a steel box with a steel plate welded inside of it. A pile cushion sits in the top of the box and two pile cushions sandwich a compression sensor in the bottom of the box. The adaptor sits on top of a concrete pile that has already been driven. A manifold cable extends out of the adaptor to one side of an electrical connector.

INSTRUMENTATION

The system consists of electronic instruments which read, record and manipulate the signals from the sensors. The instruments are a multi-channel converter 32, an oscilloscope 33 and a plotter 34. Sensor information is transmitted through manifold cables 27, through a connector 29, to an umbilical cable 31 and onto the instruments.

This invention makes use of sensitive sensors known as Piezo Film. Piezo Film transforms mechanical force into an electrical response, and conversely transforms an electrical signal into a mechanical motion. Recently, polymeric piezoelectric films have been developed. These are pliant, flexible, tough and lightweight such as polyvinylidene fluoride (PVDF) which is a base resin such as $DF_2$ and $DF_3$. The Piezo film is made in sheet form and can be fabricated into any specific design. Piezo film is much more sensitive than quartz and far more sensitive than ceramic as a transformer of mechanical energy to electrical energy. The sensors used herein are known as Mechano-Electrical sensors. A mechanical force is applied to the sensors and an electrical signal is produced which is amplified, directed into an oscilloscope and then the signal is plotted.

1. The electron flow from the sensors is converted by the multi-channel converter into a voltage, which is proportional to force and acceleration.

2. Data from the sensors can be simultaneously recorded, integrated and plotted during the hammer blow. The force curves are a unit of force versus time, and the acceleration curve is G's versus time.

Referring to FIGS. 13, 15, 17 and 20, a typical pile hammer 80, comprising a ram 81, a striker plate 82, a hammer cushion 83 a drive cap 84 and a pile cushion 85, drives a pile 24, 35, 50 and 96, respectively, as shown.

Figures 13, 14:
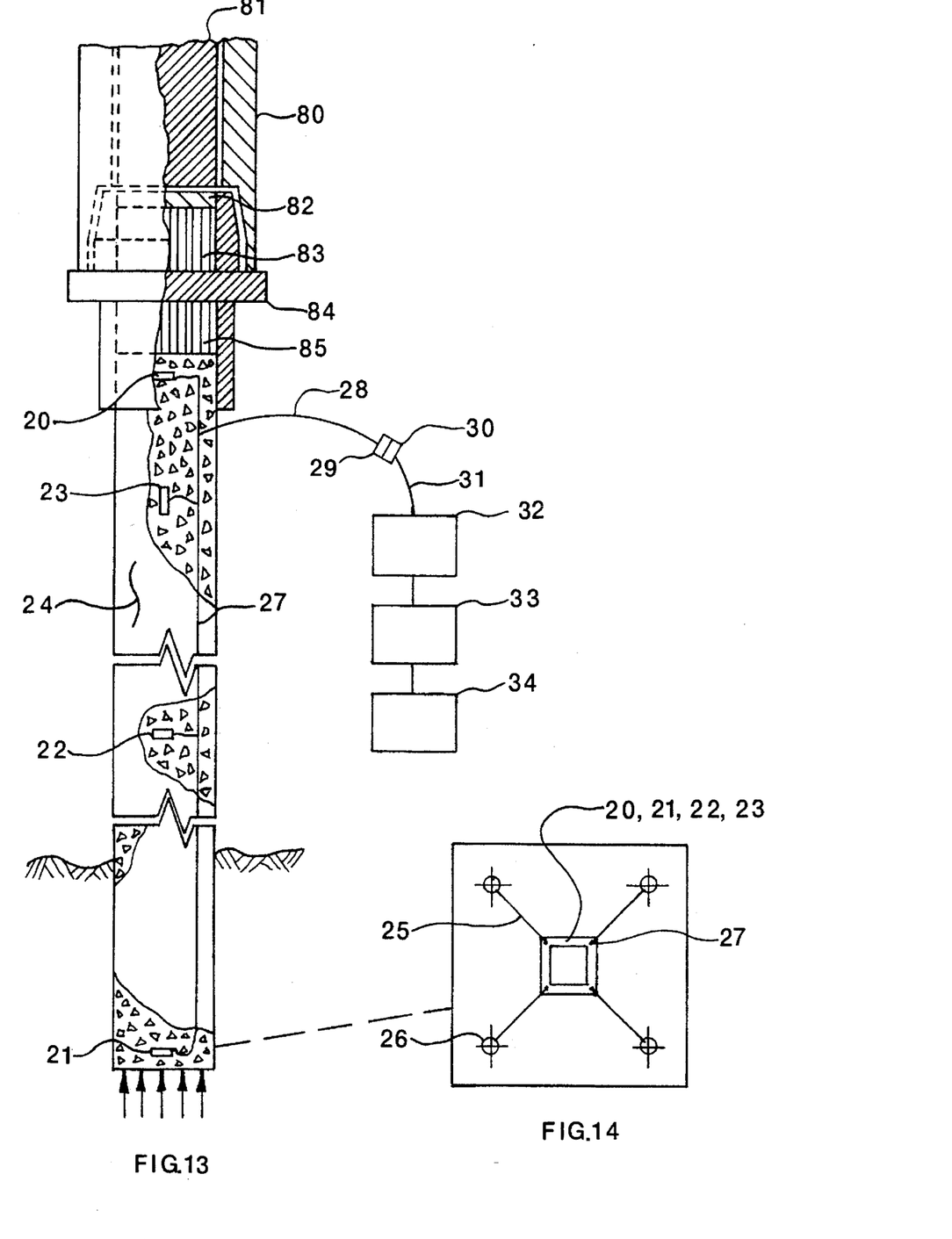
FIG. 13 is a sectional elevation of a concrete pile assembly.
FIG. 14 is an end view of the concrete pile showing the sensor placement.
Figure 15:
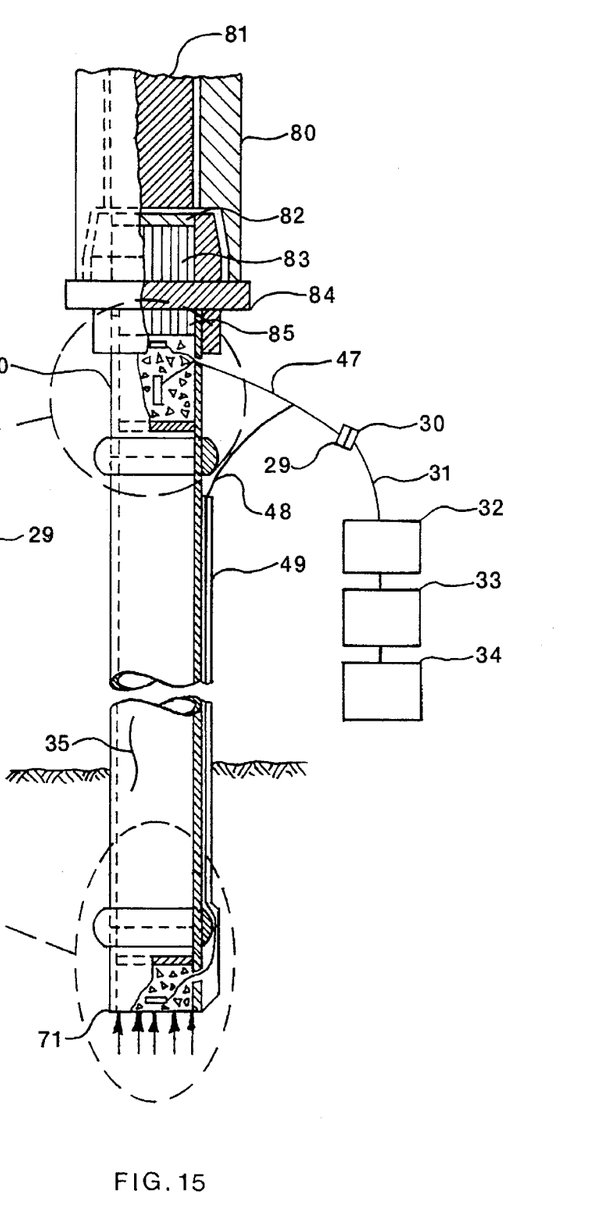
FIG. 15 is a sectional elevation of a pipe pile assembly.
Figure 16:
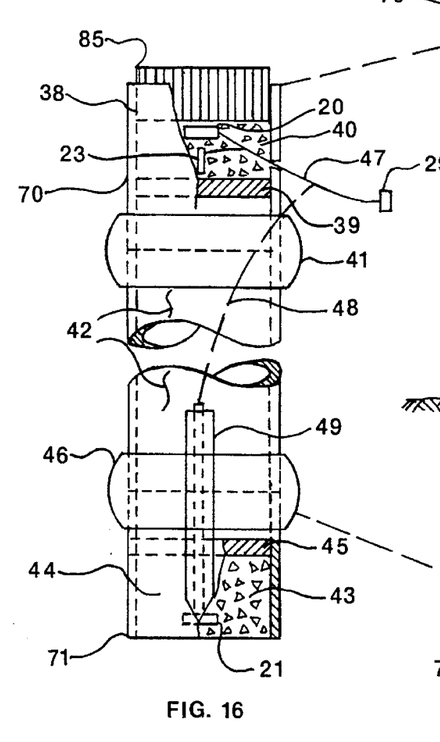
FIG. 16 is a partial enlarged elevation of the pipe pile assembly.

In FIG. 13 an elevational view of a concrete pile arrangement 24 is shown with the placement of the sensors 20, 21, 22 and 23 as shown. A compression force sensor 20 is cast in the top of the pile 24, and another force sensor 21 is cast in the bottom of the pile 24. The acceleration sensor 23 is cast in near the top of the pile 24, and the tension sensor 22 is cast in the middle of the pile 24. The sensors 20, 21, 22 and 23 are centered on the axis of the pile 24 as shown in FIG. 14, with wire supports 25 connected to the pretensioned cables 26 located in the corners of each pile. The wires 25 are either connected through holes 27 in the compression force sensors 20 and 21, as shown in FIG. 14, or the wire 25 is attached to the tension bolts 11 on the tension sensor 22, or the wire 25 wrapped around the body of the acceleration sensor 23. Also shown in FIG. 13 is a manifold cable 27. The manifold cable 27 consists of four sets of paired wires which connect sensors 20, 21, 22 and 23, and the cable 27 extends out of the pile a short distance 28 to one side of a connector 29 which is connected to the converter amplifier which is connected to the oscilloscope and plotter. Shown in FIG. 15 is an elevation of a pipe pile 35 assembly. In FIG. 16 the placement of the sensors 20, 21 and 23 is shown. The acceleration sensor 23 and a compression force sensor 20 are cast with concrete 40 into an adaptor 70 made from a short section of pipe 38. A steel plate 39 is welded in the section of pipe 38 so that the cast concrete 40 will fill only a portion of the pipe pile section 38. This is done in order for the pile cushion 85 to have a place to sit into and so the concrete 40 is not damaged by the drive tight collar 41. The opposite end of the collar 41 is placed on the section of pipe pile 42 to be driven. The bottom sensor 21 is cast with concrete 43 into an adaptor 71 made from a section of pipe 44. The concrete 43 is cast into the bottom of the pipe 44 and up to a steel plate 45 which is welded in the pipe 44 so the drive tight collar 46 cannot damage the concrete. The sensors 20, 21 and 23 are centered in a fashion similar to the concrete pile assembly 24.

Also shown in FIG. 16 is the tip manifold cable 47 which connects sensors 20 and 23 and extends out of the pile to one side of a connector 29. The bottom manifold cable 48 connects sensor 21 and extends along the pipe pile 42 to one side of the connector 29. The manifold cable is protected by a steel channel 49 which is welded to the pipe pile 42.

Figures 17, 18:
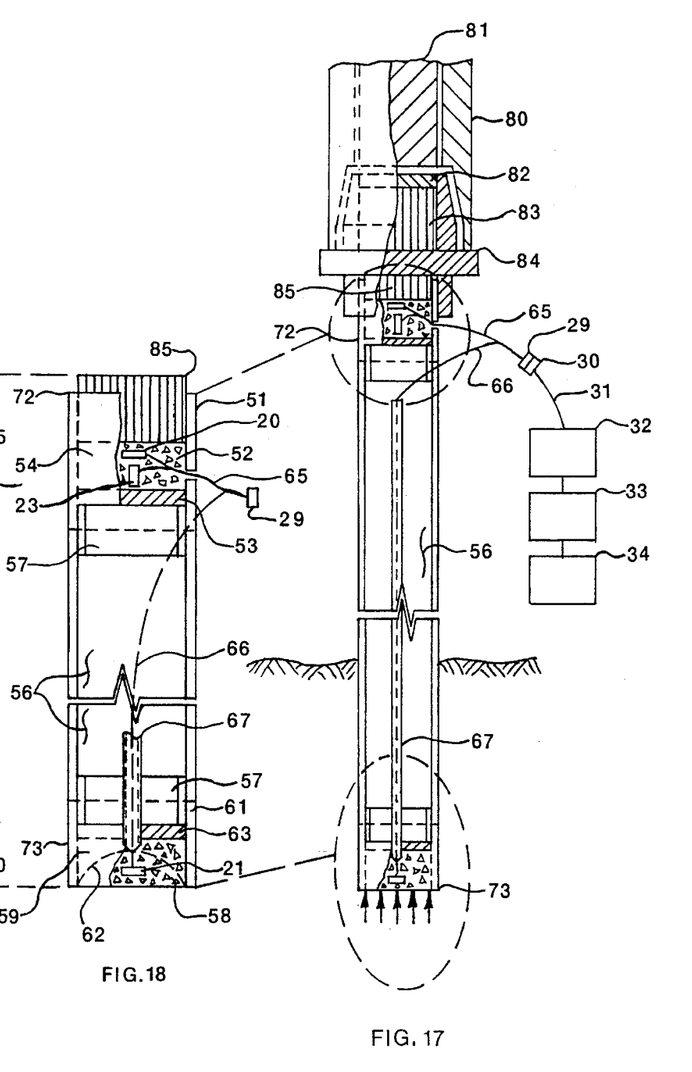
FIG. 17 is an elevation view of an "H" beam assembly.
FIG. 18 is an enlarged side elevation of an "H" beam assembly.

In FIG. 17, an elevational view of an H-beam pile 50 assembly is shown. In FIG. 18, it is shown how sensors 20 and 23 are cast with concrete 52 into an adaptor 72, made by boxing a section of H-beam pile 51. A portion of the web of the H-beam 51 is cut away and a steel plate 53 is welded into the H-beam to make a bottom. Two steel plates 54 and 55 are welded on the H-beam to make sides. The side plates 54 and 55 are better shown in FIG. 19. The adaptor 72 is only partially filled with concrete 52 in order for the pile cushion 85 to sit on top of the concrete 52. The top adaptor is attached to the H-beam pile 56 using a standard H-beam connector 57.

Figure 19:
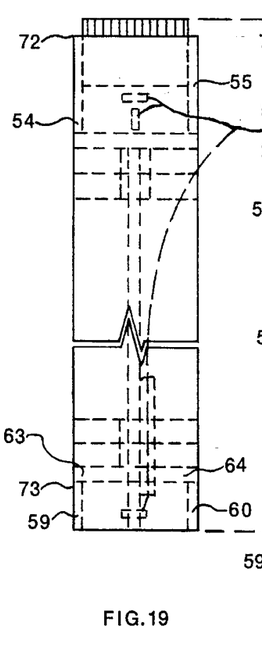
FIG. 19 is an enlarged front elevation of an "H" beam assembly.

Also shown in FIG. 18 is the bottom adaptor 73 made from a boxed section of H-beam 61. A compression force sensor 21 is cast in concrete 58. FIG. 18 and FIG. 19 shows how the cast section is boxed with two steel side plates 59 and 60 and two top plates 63 and 64 which are butted to the web of the section of H-beam pile 61. The plates 59, 60, 63 and 64 also shown in FIG. 19, are welded to the H-beam 61. The web on the H-beam 61 is scalloped 62, rather than totally cut away. The bottom adaptor 73 is attached to the H-beam pile 56 using a standard H-beam connector 57. The sensors 20, 21 and 23 in the adaptors 72 and 73 are positioned in a fashion similar to that of the concrete pile 24. FIG. 18 also shows the top manifold cable 65 which connects sensors 20 and 23. The cable 65 extends out of the pile to one side of a connector 29. The bottom manifold cable 66 connects sensor 21 and extends along the pile 56 to one side of a connector 29. The cable 66 is protected by a steel channel 67 which is welded to the web of the H-beam pile 56.

Figure 20:
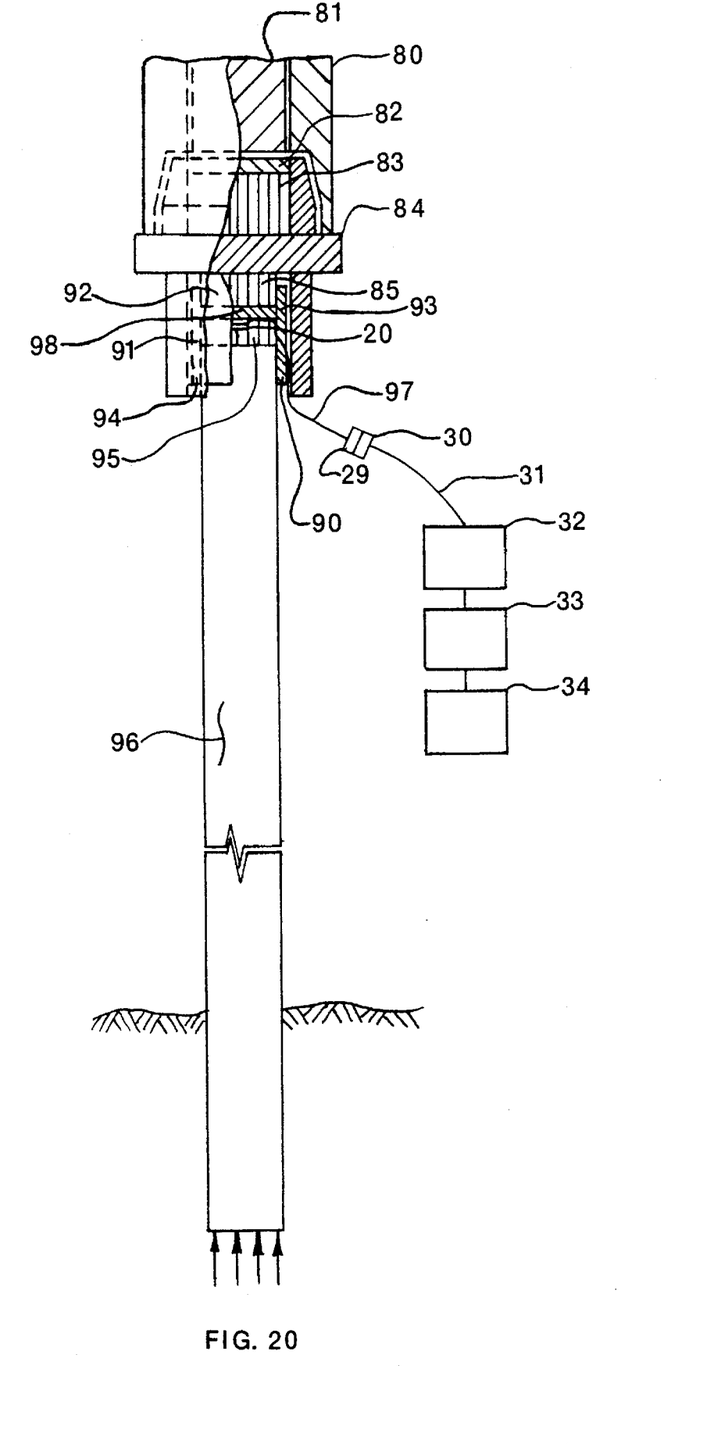
FIG. 20 is an elevation view of a concrete pile adaptor.

FIG. 20 shows a concrete pile adaptor 90 consisting of four steel side plates 91, 92, 93 and 94 and a steel middle plate 98. the pile cushion 85 sits in the top of the concrete pile adaptor 90. The bottom of the adaptor 90 has a compression force sensor 20 between the middle steel plate 98 and another pile cushion 95. The pile cushion 95 sits on top of the concrete pile 96. The sensor 20 is connected by a manifold cable 97 which extends out of the adaptor 90 to one side of a connector 29.

The side of the connector 29, that is connected to the manifold cables 27, 28, 47, 48, 65, 66 and 97 from the concrete pile 24, the pipe pile 35, the H-beam pile 50, and the concrete pile adaptor 90 is then connected to the other side of connector 30. The connector 30 is attached to an umbilical cable 31 which leads to a converter amplifier 32 then to an oscilloscope 33 and finally to a graphical plotter 34.

This invention is useful for gathering foundation information that utilizes an impulse force exerted by a hammer on a head of a pile to provide the following graphically plotted data:

1. The ultimate bearing capacity of the pile;
2. The maximum force on the head of the pile;
3. The tension force at the midpoint of the pile (only for concrete piles);
4. The resisting force exerted by the soil on the pile toe; and
5. Early detection of any pile damage while the pile is being driven such as tension cracks at the midpoint, column bending, and toe breakage or deformation.

Verifying the moment of movement, the moment of seizure, and the extent of the dynamic compression force of the hammer, by comparing the nodes and anti-nodes on the acceleration curve that occur at the same time.

By integrating the areas under the impulse curve plotted as noted above and combined with calculations the following information can be produced:

1. The percentage of effective hammer impulse imposed on the pile;
2. The percentage of hammer output that is effective in driving the pile;
3. The impulse energy absorbed by the soil prior to the pile movement;
4. The energy absorbed by the soil from the rebounding pile;
5. The amount of energy absorbed by the inertia of the pile;
6. The rate of force intensity;
7. The rate of force decay; and
8. The skin friction resistance of the soil on the pile.

The foregoing relates to a preferred exemplary embodiment of the invention, it being understood that other variants and embodiments thereof are possible within the spirit and scope of the invention, the latter being defined by the appended claims.

What is claimed:

1. A system for determining a static load bearing capacity of a pile which is driven into an immediately surrounding soil in a pile driving assembly while the pile is being dynamically driven by a pile hammer, comprising in combination:

a force sensor including a polymeric piezoelectric film that senses a force exerted by the pile hammer on the pile, said film being defined by a first surface for directly receiving said force which is exerted substantially perpendicularly to said first surface, a second surface in opposed relation to said first surface, and a peripheral side wall circumscribing and bounding said first surface and said second surface, the area of said first surface having substantially greater area than the area of said side wall, wherein the sensor transforms the force received on said first surface directly into an electrical signal and the sensor is fast enough and sensitive enough to produce an electrical signal which corresponds to all phases of the force exerted during a blow by the pile hammer including a first static phase before the pile begins to move through the immediately surrounding soil, a dynamic phase while the pile penetrates through the immediately surrounding soil, and a second static phase after the pile stops moving relative to the immediately surrounding soil;

amplifier means to receive and amplify said electrical signal and to produce an output which corresponds to all said phases of the force exerted during a blow by the pile hammer.

2. The system as claimed in claim 1, including means coupled to the output of said amplifier for indicating all three said phases of said force.

3. The system claimed in claim 2, wherein said means for indicating is a plotter.

4. A system for determining a static load bearing capacity of a pile which is driven into an immediately surrounding soil in a pile driving assembly while the pile is being dynamically driven by a pile hammer, comprising in combination:

a force sensor using polymeric piezo electric film that senses a force exerted by the pile hammer on the pile, wherein the sensor transforms force directly into an electrical signal and the sensor produces an electrical signal which corresponds to all phases of the force exerted during a blow by the pile hammer including a first static phase before the pile begins to move through the immediately surrounding soil, a dynamic phase while the pile penetrates through the immediately surrounding soil, and a second static phase after the pile stops moving relative to the immediately surrounding soil, said polymeric piezo electric film being defined by a first surface for directly receiving said force exerted substantially perpendicularly to said first surface by the pile hammer, a second surface in opposed relation to said first surface, and a peripheral side wall circumscribing and bounding said first surface and said second surface, the area of said first surface having substantially greater area than the area of said side wall, wherein the sensor transforms the force receive on said first surface directly into an electrical signal;

an accelerometer;

amplifier means to receive and amplify said electrical signal, said amplifier means including an output, and means coupled to the output of said amplifier for indicating all three said phases of said force.

5. The system as claimed in claim 4, wherein said means for indicating is an oscilloscope.

6. The system as claimed in claim 4, wherein said means for indicating is a plotter.

7. The system as claimed in claim 4 wherein said accelerometer includes a piezo cable.

8. The system as claimed in claim 4 wherein said accelerometer produces an acceleration signal which corresponds to the variations in the acceleration of said pile throughout a blow by said pile hammer and wherein said amplifier means receives and amplifies said acceleration signal, said amplifier means including a second output corresponding to the amplified acceleration signal, and said means for indicating is also coupled to the second output of said amplifier for indicating the acceleration of said pile throughout a blow by said pile hammer.

9. In a pile and hammer system which includes a force sensor comprising a polymeric piezo electric film defined by a first surface for directly receiving a force exerted substantially perpendicularly to said first surface by the hammer and a second surface in opposed relation to said first surface, wherein the sensor transforms the force received on said first surface directly into an electrical signal and which also includes an accelerometer which transforms force directly into an electrical signal, the method of using said force sensor and said accelerometer in determining the static load bearing capacity of the pile while it is being dynamically struck by a hammer and driven into an immediately surrounding soil, comprising the steps of:

connecting the force sensor to the system to directly produce a first electrical signal which corresponds to all phases of the hammer force exerted on said pile during the duration of a blow by the hammer including a first static phase before the pile begins to move through the immediately surrounding soil, a dynamic phase while the pile penetrates through the immediately surrounding soil, and a second static phase after the pile stops moving relative to the immediately surrounding soil;

connecting the accelerometer to the system to directly produce an acceleration signal which corresponds to the changes of the acceleration of the pile during the duration of a blow by the hammer;

amplifying said first electrical signal to produce a first output;

amplifying said acceleration signal to produce a second output; and utilizing said first output and said second output to simultaneously indicate said hammer force during the duration of a blow by the hammer and the acceleration of the pile during the duration of a blow by the hammer.

10. The method of claim 9 wherein the step of utilizing the first output and the second output uses an oscilloscope.

11. The method of claim 9 wherein the step of utilizing the first output and the second output uses a plotter.

12. The method of claim 9 wherein said accelerometer includes a piezo cable.

13. A system for determining a static load bearing capacity of a pile which is driven into an immediately surrounding soil in a pile driving assembly while the pile is being dynamically driven by a pile hammer, comprising in combination:

a force sensor that senses a force exerted by the pile hammer on the pile, said sensor including a polymeric piezo electric film defined by a first surface for directly receiving said force exerted substantially perpendicularly to said first surface by the pile hammer and a second surface in opposed relation to said first surface, wherein the sensor transforms force received on said first surface directly into an electrical signal and the sensor is fast enough and sensitive enough to produce an electrical signal which corresponds to all phases of the force exerted during a blow by the pile hammer including a first static phase before the pile begins to move through the immediately surrounding soil, a dynamic phase while the pile penetrates through the immediately surrounding soil, and a second static phase after the pile stops moving relative to the immediately surrounding soil;

an accelerometer for measuring the acceleration of the pile during a blow by the pile hammer;

amplifier means to receive and amplify said electrical signal, said amplifier means including an output; and means coupled to the output of said amplifier for indicating all three said phases of said force.

14. A system for determining the static load bearing capacity of a pile based on static resistance while that pile is being driven by a pile hammer into soil, comprising in combination:

a force sensor that senses the magnitude of the force exerted by the pile hammer on the pile, said sensor including a polymeric piezo electric film defined by a first surface for directly receiving said force exerted substantially perpendicularly to said first surface by the pile hammer and a second surface in opposed relation to said first surface, wherein the sensor transforms force received on said first surface directly into an electrical signal and wherein the sensor is fast enough and sensitive enough to produce an electrical output which corresponds in detail to the magnitude of the force exerted during a blow by the pile hammer including a first static phase of the force before the pile begins to move through the immediately surrounding soil and a dynamic phase of the force while the pile penetrates through the immediately surrounding soil and means coupled to the output of said force sensor for clearly indicating the magnitude of the pile hammer force during said static phase of the force and the magnitude of the pile hammer force during said dynamic phase of said force so that said static load bearing capacity can be determined based on the magnitude of said force during said static phase.

15. A system as claimed in claim 14, also comprising an accelerometer.

16. A system as claimed in claim 15 wherein said accelerometer produces an output which corresponds to the variations in the acceleration of said pile during a blow by said pile hammer and wherein said means for indicating is also coupled to the output of said accelerometer for indicating the acceleration of said pile during a blow by said pile hammer.

17. The system as claimed in claim 13 wherein said accelerometer includes a piezo cable.

18. The system as claimed in claim 13 wherein said accelerometer produces an acceleration signal which corresponds to the variations in the acceleration of said pile during a blow by said pile hammer and wherein said amplifier means receives and amplifies said acceleration signal, said amplifier means including a second output corresponding to the amplified acceleration signal, and said means for indicating is also coupled to the second output of said of said amplifier means for indicating the acceleration of said pile during a blow by said pile hammer.

\* \* \* \* \*